United States Patent
Sakai et al.

(10) Patent No.: US 12,215,196 B2
(45) Date of Patent: Feb. 4, 2025

(54) POLYIMIDE RESIN COMPOSITION

(71) Applicant: MITSUBISHI GAS CHEMICAL COMPANY, INC., Chiyoda-ku (JP)

(72) Inventors: Atsushi Sakai, Kanagawa (JP); Yuuki Sato, Kanagawa (JP); Fumihiro Fukuda, Kanagawa (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 581 days.

(21) Appl. No.: 17/611,691

(22) PCT Filed: May 7, 2020

(86) PCT No.: PCT/JP2020/018480
§ 371 (c)(1),
(2) Date: Nov. 16, 2021

(87) PCT Pub. No.: WO2020/241185
PCT Pub. Date: Dec. 3, 2020

(65) Prior Publication Data
US 2022/0213269 A1    Jul. 7, 2022

(30) Foreign Application Priority Data
May 31, 2019    (JP) .................. 2019-102464

(51) Int. Cl.
| C08G 73/10 | (2006.01) |
| C08J 5/04 | (2006.01) |
| C08K 13/02 | (2006.01) |
| C08K 3/34 | (2006.01) |
| C08K 3/40 | (2006.01) |
| C08K 5/098 | (2006.01) |

(52) U.S. Cl.
CPC ..... *C08G 73/1082* (2013.01); *C08G 73/1042* (2013.01); *C08J 5/043* (2013.01); *C08K 13/02* (2013.01); *C08K 3/346* (2013.01); *C08K 3/40* (2013.01); *C08K 5/098* (2013.01)

(58) Field of Classification Search
CPC ............ C08G 73/1082; C08G 73/1042; C08K 3/346; C08K 3/40; C08K 5/098; C08K 13/02; C08J 5/043
See application file for complete search history.

(56) References Cited

U.S. PATENT DOCUMENTS

| 2010/0304160 A1 | 12/2010 | Fukukawa et al. |
| 2016/0177062 A1 | 6/2016 | Sato et al. |
| 2017/0130003 A1 | 5/2017 | Sato |

FOREIGN PATENT DOCUMENTS

| CN | 101874078 A | 10/2010 |
| CN | 104582960 A | 4/2015 |
| CN | 105392842 A | 3/2016 |
| CN | 106536598 A | 3/2017 |
| JP | 2005-28524 A | 2/2005 |
| JP | 2009-226632 A | 10/2009 |
| JP | 2018-27660 A | 2/2018 |
| WO | WO 2014/041816 A1 | 3/2014 |
| WO | WO 2015/020020 A1 | 2/2015 |
| WO | WO 2016/147996 A1 | 9/2016 |

OTHER PUBLICATIONS

International Search Report mailed on Jul. 28, 2020 in PCT/JP2020/018480 filed on May 7, 2020 (2 pages).

*Primary Examiner* — John E Uselding
(74) *Attorney, Agent, or Firm* — Oblon, McClelland, Maier & Neustadt, L.L.P.

(57) ABSTRACT

A polyimide resin composition includes a polyimide resin (A) including a repeating structural units of formulas (1) and (2). The content ratio of the repeating structural unit of the formula (1) with respect to the total of the repeating structural units of the formulas (1) and (2) is 20 to 70 mol %. The polyimide resin composition further includes a fatty acid metal salt (B) including a fatty acid having 12 to 36 carbon atoms and optionally having a hydroxy group and at least one of an alkali metal, an alkaline earth metal, and a transition metal:

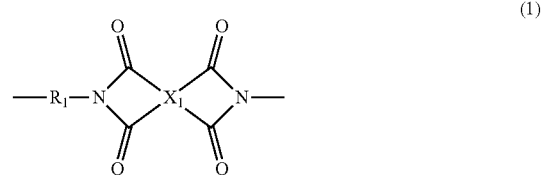

(1)

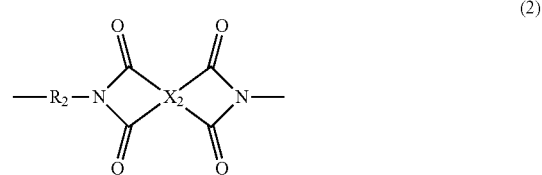

(2)

wherein $R_1$ represents a divalent group having 6 to 22 carbon atoms containing at least one alicyclic hydrocarbon structure; $R_2$ represents a divalent chain aliphatic group having 5 to 16 carbon atoms; and $X_1$ and $X_2$ each independently represent a tetravalent group having 6 to 22 carbon atoms containing at least one aromatic ring.

10 Claims, No Drawings

POLYIMIDE RESIN COMPOSITION

CROSS-REFERENCE TO RELATED APPLICATIONS

The present application is a 35 U.S.C. § 371 national stage patent application of International patent application PCT/JP2020/018480, filed on May 7, 2020, which is based on and claims the benefits of priority to Japanese Application No. 2019-102464, filed on May 31, 2019. The entire contents of these applications are incorporated herein by reference.

TECHNICAL FIELD

The present invention relates to a polyimide resin composition.

BACKGROUND ART

A polyimide resin is a useful engineering plastic that has high thermal stability, high strength and high solvent resistance due to rigidity, resonance stabilization and firm chemical bond of the molecular chain thereof, and is being applied to a wide range of fields. A polyimide resin having crystallinity is further enhanced in the heat resistance, the strength and the chemical resistance thereof, and thus is expected for applications as alternatives of metals or the like. While a polyimide resin has high heat resistance, however, it has the problems of exhibiting no thermoplasticity and having low molding process ability.

Vespel (registered trademark), a highly heat-resistant resin, is known as a polyimide molding material (PTL 1). This resin is difficult to process by molding due to its very low flowability even at a high temperature, and is also disadvantageous in terms of cost because it requires molding under conditions of a high temperature and a high pressure for a prolonged period of time. In contrast to this, a resin having a melting point and flowability at a high temperature, such as a crystalline resin, may be processed by molding easily and inexpensively.

Thus, a polyimide resin having thermoplasticity has been reported in recent years. Such a thermoplastic polyimide resin is excellent in molding processability in addition to the original heat resistance of the polyimide resin. The thermoplastic polyimide resin is therefore applicable to a molded article for use in an inhospitable environment to which nylon or polyester, a general purpose thermoplastic resin, is inapplicable.

It is known to add a mold release agent to a thermoplastic resin for the purpose of improving releasability from a mold on subjecting the thermoplastic resin to molding processing.

For example, PTL 2 discloses a composite material containing a fiber material (C) impregnated with a thermoplastic polyimide resin (A) having a particular structure and mentions that an additive such as a mold release agent may be added to the polyimide resin (A). PTL 3 mentions that a resin composition may be obtained by blending a slidability-improving agent to a thermoplastic polyimide resin having a particular structure and having a particular physical property and exemplifies solid lubricants such as metal soap as the slidability-improving agent.

CITATION LIST

Patent Literature

PTL 1: JP-A-2005-28524
PTL 2: WO2015/020020
PTL 3: WO2016/147996

SUMMARY OF INVENTION

Technical Problem

The polyimide resins mentioned in PTLs 2 and 3 have good heat resistance and are also excellent in molding processability because of having thermoplasticity. Meanwhile, the polyimide resins have a melting point higher than those of general purpose thermoplastic resins such as nylon and polyester. For this reason, for example, in PTL 2, the polyimide resin and a mold release agent are mixed and melt-kneaded at a temperature of 300° C. or more. The resulting polyimide resin composition as a molding material is heat-molded at a temperature of 300° C. or more to produce a molded article.

However, depending on the type of the mold release agent, under heating conditions of 300° C. or more, pyrolysis or the like occurs, and good releasability may not be necessarily developed. Further, because of occurrence of pyrolysis or the like of the mold release agent, the hue of a polyimide resin composition to be obtained and the hue of a molded article to be prepared may be changed, and the value of products may be degraded.

In PTLs 2 and 3, although the temperature at which a polyimide resin composition is obtained and the temperature at which a molded article is produced is 300° C. or more, selection of a mold release agent with which good releasability is developed has not been especially contemplated, and thus, there is room for further investigation.

Then, an object of the present invention is to provide a polyimide resin composition having good molding processability and heat resistance and developing good releasability even when subjected to heat molding (e.g., injection molding) under heating conditions of 300° C. or more.

Solution to Problem

The present inventors have found that the aforementioned object can be attained by a polyimide resin composition containing a polyimide resin containing particular different polyimide structural units combined at a particular ratio and a particular fatty acid metal salt (B).

That is, the present invention provides a polyimide resin composition containing a polyimide resin (A) and a fatty acid metal salt (B), the polyimide resin (A) containing a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) being 20 to 70 mol %, the fatty acid metal salt (B) being composed of a fatty acid having 12 to 36 carbon atoms and optionally having a hydroxy group and at least one metal selected from the group consisting of an alkali metal, an alkaline earth metal, and a transition metal:

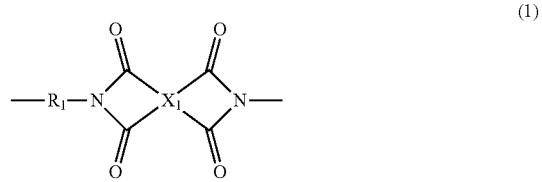

-continued

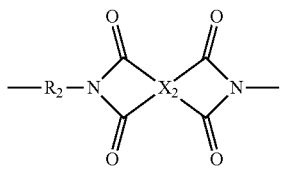
(2)

wherein R$_1$ represents a divalent group having 6 to 22 carbon atoms containing at least one alicyclic hydrocarbon structure; R$_2$ represents a divalent chain aliphatic group having 5 to 16 carbon atoms; and X$_1$ and X$_2$ each independently represent a tetravalent group having 6 to 22 carbon atoms containing at least one aromatic ring.

Advantageous Effects of Invention

According to the present invention, there can be provided a polyimide resin composition having good molding processability and heat resistance and developing good releasability even when subjected to heat molding (e.g., injection molding) under heating conditions of 300° C. or more.

The polyimide resin composition of the present invention can be applied in, for example, various industrial members for automobiles, railway, aviation, and the like, members for household electrical products, or enclosures therefor and the like. Specifically, the polyimide resin composition can be applied in gears, bearings, cutting members, screws, nuts, packings, IC sockets for inspection, belts, covering materials for electrical wire and the like, cover-lay films, members for semiconductor manufacturing apparatuses, medical instruments, covering materials for fishing rods, reels, and the like, stationery, and the like.

DESCRIPTION OF EMBODIMENTS

[Polyimide Resin Composition]

The polyimide resin composition of the present invention is a polyimide resin composition containing a polyimide resin (A) and a fatty acid metal salt (B), the polyimide resin (A) containing a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) being 20 to 70 mol %, the fatty acid metal salt (B) being composed of at least one fatty acid selected from the group consisting of a fatty acid having 12 to 36 carbon atoms and a fatty acid having 12 to 36 carbon atoms and having a hydroxyl group and at least one metal selected from the group consisting of an alkali metal, an alkaline earth metal, and a transition metal:

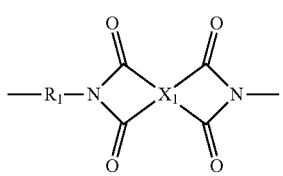
(1)

-continued

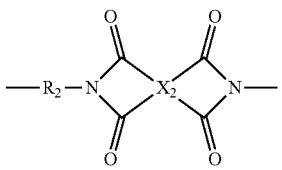
(2)

wherein R$_1$ represents a divalent group having 6 to 22 carbon atoms containing at least one alicyclic hydrocarbon structure; R$_2$ represents a divalent chain aliphatic group having 5 to 16 carbon atoms; and X$_1$ and X$_2$ each independently represent a tetravalent group having 6 to 22 carbon atoms containing at least one aromatic ring.

According to such a polyimide resin composition of the present invention, a molded article excellent in releasability can be provided.

<Polyimide Resin (A)>

The polyimide resin (A) used in the present invention contains a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) being 20 to 70 mol %:

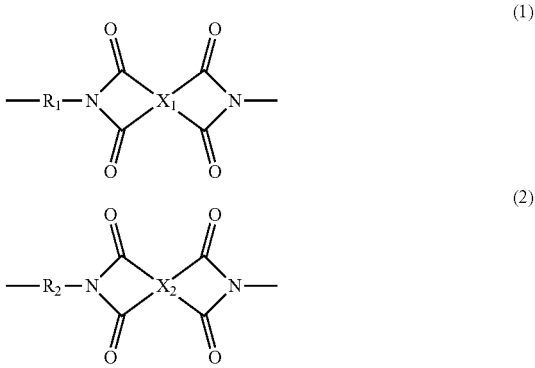

wherein R$_1$ represents a divalent group having 6 to 22 carbon atoms containing at least one alicyclic hydrocarbon structure; R$_2$ represents a divalent chain aliphatic group having 5 to 16 carbon atoms; and X$_1$ and X$_2$ each independently represent a tetravalent group having 6 to 22 carbon atoms containing at least one aromatic ring.

The polyimide resin (A) used in the present invention is a thermoplastic resin, which is preferably in a powder or pellet form. The thermoplastic polyimide resin is distinguished from, for example, polyimide resins formed by closing the imide ring after shaping in a state of a polyimide precursor such as a polyamic acid and having no glass transition temperature (Tg), or polyimide resins that decompose at a temperature lower than the glass transition temperature.

The repeating structural unit of formula (1) will be described in detail below.

R$_1$ represents a divalent group having 6 to 22 carbon atoms containing at least one alicyclic hydrocarbon structure. The alicyclic hydrocarbon structure herein means a ring derived from an alicyclic hydrocarbon compound, and the alicyclic hydrocarbon compound may be either saturated or unsaturated and may be either monocyclic or polycyclic.

Examples of the alicyclic hydrocarbon structure include a cycloalkane ring, such as a cyclohexane ring, a cycloalkene ring, such as cyclohexene, a bicycloalkane ring, such as a norbornane ring, and a bicycloalkene ring, such as norbornene, but the alicyclic hydrocarbon structure is not limited thereto. Among these, a cycloalkane ring is preferred, a cycloalkane ring having 4 to 7 carbon atoms is more preferred, and a cyclohexane ring is further preferred.

$R_1$ has 6 to 22 carbon atoms, and preferably 8 to 17 carbon atoms.

$R_1$ contains at least one alicyclic hydrocarbon structure, and preferably 1 to 3 alicyclic hydrocarbon structures.

$R_1$ is preferably a divalent group represented by the following formula (R1-1) or (R1-2);

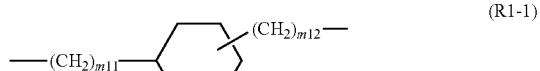

(R1-1)

(R1-2)

wherein $m_{11}$ and $m_{12}$ each independently represent an integer of 0-2, and preferably 0 or 1; and $m_{13}$ to $m_{15}$ each independently represent an integer of 0-2, and preferably 0 or 1.

$R_1$ is particularly preferably a divalent group represented by the following formula (R1-3):

(R1-3)

In the divalent group represented by the formula ($R_1$-3), the conformation of the two methylene groups with respect to the cyclohexane ring may be either cis or trans, and the ratio of cis and trans may be an arbitrary value.

$X_1$ is a tetravalent group having 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$X_1$ has 6 to 22 carbon atoms, and preferably has 6 to 18 carbon atoms.

$X_1$ contains at least one aromatic ring, and preferably contains 1 to 3 aromatic rings.

$X_1$ is preferably a tetravalent group represented by one of the following formulae (X-1) to (X-4):

(X-1)

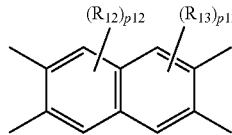

(X-2)

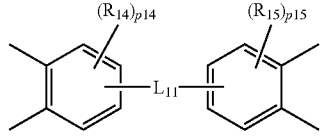

(X-3)

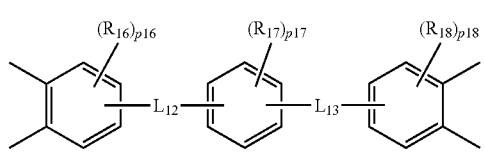

(X-4)

wherein $R_{11}$ to $R_{18}$ each independently represent an alkyl group having 1 to 4 carbon atoms; $p_{11}$ to $p_{13}$ each independently represent an integer of 0-2, and preferably 0; $p_{14}$, $p_{15}$, $p_{16}$ and $p_{18}$ each independently represent an integer of 0-3, and preferably 0; $p_{17}$ represents an integer of 0-4, and preferably 0; and $L_{11}$ to $L_{13}$ each independently represent a single bond, an ether group, a carbonyl group or an alkylene group having 1 to 4 carbon atoms.

$X_1$ is a tetravalent group having 6 to 22 carbon atoms containing at least one aromatic ring, and therefore $R_{19}$, $R_{13}$, $p_{12}$ and $p_{13}$ in the formula (X-2) are selected in such a manner that the tetravalent group represented by the formula (X-2) has 10 to 22 carbon atoms.

Similarly, $L_{11}$, $R_{14}$, $R_{15}$, $P_{14}$ and $p_{15}$ in the formula (X-3) are selected in such a manner that the tetravalent group represented by the formula (X-3) has 12 to 22 carbon atoms, and $L_{12}$, $L_{13}$, $R_{16}$, $R_{17}$, $R_{18}$, $p_{16}$, $p_{17}$ and $p_{18}$ in the formula (X-4) are selected in such a manner that the tetravalent group represented by the formula (X-4) has 18 to 22 carbon atoms.

$X_1$ is particularly preferably a tetravalent group represented by the following formula (X-5) or (X-6):

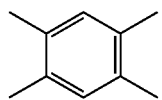

(X-5)

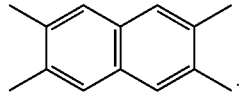

(X-6)

Next, the repeating structural unit of formula (2) will be described in detail below.

$R_2$ represents a divalent chain aliphatic group having 5 to 16 carbon atoms, preferably 6 to 14 carbon atoms, more preferably 7 to 12 carbon atoms, and further preferably 8 to 10 carbon atoms. The chain aliphatic group herein means a group derived from a chain aliphatic compound, and the chain aliphatic compound may be either saturated or unsaturated, may be in the form of either linear or branched chain, and may contain a hetero atom, such as an oxygen atom.

$R_2$ is preferably an alkylene group having 5 to 16 carbon atoms, more preferably an alkylene group having 6 to 14 carbon atoms, further preferably an alkylene group having 7 to 12 carbon atoms, and particularly preferably an alkylene group having 8 to 10 carbon atoms. The alkylene group may be either a linear alkylene group or a branched alkylene group, and is preferably a linear alkylene group.

$R_2$ preferably represents at least one selected from the group consisting of an octamethylene group and a decamethylene group, and particularly preferably represents an octamethylene group.

Another preferred embodiment of $R_2$ is a divalent chain aliphatic group having 5 to 16 carbon atoms containing an ether group. The divalent chain aliphatic group preferably has 6 to 14 carbon atoms, more preferably 7 to 12 carbon atoms, and further preferably 8 to 10 carbon atoms. Preferred examples of the group include a divalent group represented by the following formula ($R_2$-1) or (R2-2):

   ($R_2$-1)

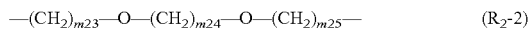   ($R_2$-2)

wherein $m_{21}$ and $m_{22}$ each independently represent an integer of 1-15, preferably 1-13, more preferably 1-11, and further preferably 1-9; and $m_{23}$ to $m_{25}$ each independently represent an integer of 1-14, preferably 1-12, more preferably 1-10, and further preferably 1-8.

$R_2$ represents a divalent chain aliphatic group having 5 to 16 carbon atoms (preferably 6 to 14 carbon atoms, more preferably 7 to 12 carbon atoms, and further preferably 8 to 10 carbon atoms), and therefore $m_{21}$ and $m_{22}$ in the formula ($R_2$-1) are selected so that the divalent group represented by the formula ($R_2$-1) has 5 to 16 carbon atoms (preferably from 6 to 14 carbon atoms, more preferably 7 to 12 carbon atoms, and further preferably 8 to 10 carbon atoms), i.e., $m_{21}+m_{22}$ is 5 to 16 (preferably 6 to 14, more preferably 7 to 12, and further preferably 8 to 10).

Similarly, $m_{23}$ to $m_{25}$ in the formula ($R_2$-2) are selected so that the divalent group represented by the formula ($R_2$-2) has 5 to 16 carbon atoms (preferably 6 to 14 carbon atoms, more preferably 7 to 12 carbon atoms, and further preferably 8 to 10 carbon atoms), i.e., $m_{23}+m_{24}+m_{25}$ is 5 to 16 (preferably 6 to 14 carbon atoms, more preferably 7 to 12 carbon atoms, and further preferably 8 to 10 carbon atoms).

$X_2$ is defined similarly to $X_1$ in the formula (1), and preferred embodiments thereof are also the same.

The content ratio of the repeating structural unit of the formula (1) with respect to the total of the repeating structural unit of the formula (1) and the repeating structural unit of the formula (2) is 20 mol % to 70 mol %. In the case where the content ratio of the repeating structural unit of the formula (1) is in the above range, the polyimide resin may also be sufficiently crystallized in an ordinary injection molding cycle. When the content ratio is less than 20 mol %, molding processability is deteriorated, and when the content ratio is more than 70 mol %, crystallinity is deteriorated to thereby result in deterioration in heat resistance.

The content ratio of the repeating structural unit of the formula (1) with respect to the total of the repeating structural unit of the formula (1) and the repeating structural unit of the formula (2) is preferably 65 mol % or less, more preferably 60 mol % or less, and further preferably 50 mol % or less from the viewpoint of exerting high crystallinity.

Among these, the content ratio of the repeating structural unit of the formula (1) with respect to the total of the repeating structural unit of the formula (1) and the repeating structural unit of the formula (2) is preferably 20 mol % or more and less than 40 mol %. When the ratio falls within this range, the crystallinity of the polyimide resin (A) increases, and it is possible to obtain a resin composition being more excellent in heat resistance.

The content ratio described above is preferably 25 mol % or more, more preferably 30 mol % or more, further preferably 32 mol % or more from the viewpoint of molding processability, and is further preferably 35 mol % or less from the viewpoint of exerting high crystallinity.

The content ratio of the total of the repeating structural unit of the formula (1) and the repeating structural unit of the formula (2) with respect to the total repeating structural units constituting the polyimide resin (A) is preferably 50 to 100 mol %, more preferably 75 to 100 mol %, further preferably 80 to 100 mol %, and still further preferably 85 to 100 mol %.

The polyimide resin (A) may further contain a repeating structural unit represented by the following formula (3). In this case, the content ratio of the repeating structural unit of formula (3) with respect to the total of the repeating structural unit of formula (1) and the repeating structural unit of formula (2) is preferably 25 mol % or less. The lower limit thereof is not particularly limited but needs to exceed 0 mol %.

The content ratio is preferably 5 mol % or more, and more preferably 10 mol % or more, from the viewpoint of enhancement of the heat resistance, and is preferably 20 mol % or less, and more preferably 15 mol % or less, from the viewpoint of maintenance of the crystallinity.

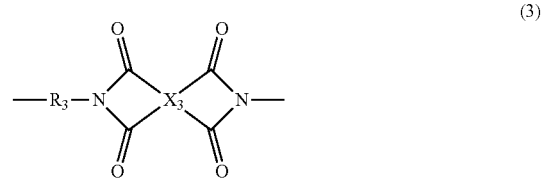   (3)

wherein $R_3$ represents a divalent group having 6 to 22 carbon atoms containing at least one aromatic ring; and $X_3$ represents a tetravalent group having 6 to 22 carbon atoms containing at least one aromatic ring.

$R_3$ is a divalent group having 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$R_3$ has 6 to 22 carbon atoms, and preferably has 6 to 18 carbon atoms.

$R_3$ contains at least one aromatic ring, and preferably contains 1 to 3 aromatic rings.

The aromatic ring may also be bonded to a monovalent or divalent electron-attracting group. Examples of the monovalent electron-attracting group include a nitro group, a cyano group, a p-toluenesulfonyl group, halogen, an alkyl halide group, a phenyl group, and an acyl group. Examples of the divalent electron-attracting group include alkylene halide groups such as alkylene fluoride groups (e.g., —C($CF_3$)$_2$— and —($CF_2$)$_p$— (wherein p is an integer of 1-10), as well as —CO—, —$SO_2$—, —SO—, —CONH—, and —COO—.

$R_3$ is preferably a divalent group represented by the following formula (R3-1) or (R3-2):

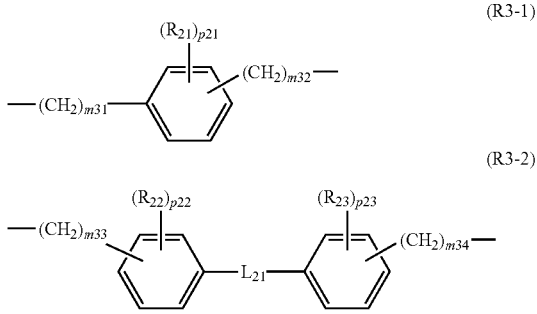

wherein $m_{31}$ and $m_{32}$ each independently represent an integer of 0-2, and preferably 0 or 1; $m_{33}$ and $m_{34}$ each independently represent an integer of 0-2, and preferably 0 or 1; $R_{21}$, $R_{22}$ and $R_{23}$ each independently represent an alkyl group having 1 to 4 carbon atoms, an alkenyl group having 2 to 4 carbon atoms or an alkynyl group having 2 to 4 carbon atoms; $p_{21}$, $p_{22}$ and $p_{23}$ each represent an integer of 0-4, and preferably 0; and $L_{21}$ represents a single bond, an ether group, a carbonyl group or an alkylene group having 1 to 4 carbon atoms.

$R_3$ is a divalent group having 6 to 22 carbon atoms containing at least one aromatic ring, and therefore $m_{31}$, $m_{32}$, $R_{21}$ and $p_{21}$ in the formula (R3-1) are selected in such a manner that the divalent group represented by the formula (R3-1) has 6 to 22 carbon atoms.

Similarly, $L_{21}$, $m_{33}$, $m_{34}$, $R_{22}$, $R_{23}$, $p_{22}$ and $p_{23}$ in the formula (R3-2) are selected in such a manner that the divalent group represented by the formula (R3-2) has 12 to 22 carbon atoms.

$X_3$ is defined similarly to $X_1$ in the formula (1), and preferred embodiments thereof are also the same.

The polyimide resin (A) may further contain a repeating structural unit represented by the following formula (4):

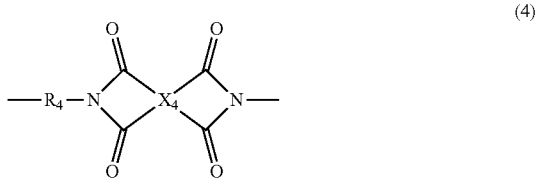

wherein $R_4$ represents a divalent group containing —$SO_2$— or —$Si(R_x)(R_y)O$—; $R_x$ and $R_y$ each independently represent a chain aliphatic group having 1 to 3 carbon atoms, or a phenyl group; and $X_4$ represents a tetravalent group having 6 to 22 carbon atoms containing at least one aromatic ring.

$X_4$ is defined similarly to $X_1$ in the formula (1), and preferred embodiments thereof are also the same.

The end structure of the polyimide resin (A) is not particularly limited, and preferably has a chain aliphatic group having 5 to 14 carbon atoms at the end thereof.

The chain aliphatic group may be either saturated or unsaturated, and may be in the form of either linear or branched chain. When the polyimide resin (A) contains the above particular group at the end thereof, it is possible to obtain a resin composition excellent in heat aging resistance.

Example of the saturated chain aliphatic group having 5 to 14 carbon atoms include an n-pentyl group, an n-hexyl group, an n-heptyl group, an n-octyl group, an n-nonyl group, an n-decyl group, an n-undecyl group, a lauryl group, an n-tridecyl group, an n-tetradecyl group, an isopentyl group, a neopentyl group, a 2-methylpentyl group, a 2-methylhexyl group, a 2-ethylpentyl group, a 3-ethylpentyl group, an isooctyl group, a 2-ethylhexyl group, a 3-ethylhexyl group, an isononyl group, a 2-ethyloctyl group, an isodecyl group, an isododecyl group, an isotridecyl group and an isotetradecyl group.

Example of the unsaturated chain aliphatic group having 5 to 14 carbon atoms include a 1-pentenyl group, a 2-pentenyl group, a 1-hexenyl group, a 2-hexenyl group, a 1-heptenyl group, a 2-heptenyl group, a 1-octenyl group, a 2-octenyl group, a nonenyl group, a decenyl group, a dodecenyl group, a tridecenyl group and a tetradecenyl group.

Among these, the chain aliphatic group is preferably a saturated chain aliphatic group, and more preferably a saturated linear aliphatic group. The chain aliphatic group preferably has 6 or more carbon atoms, more preferably 7 or more carbon atoms and further preferably 8 or more carbon atoms, and preferably has 12 or less carbon atoms, more preferably 10 or less carbon atoms and further preferably 9 or less carbon atoms from the viewpoint of achievement of heat aging resistance. The chain aliphatic group may be adopted singly or in combinations of two or more.

The chain aliphatic group is particularly preferably at least one selected from the group consisting of an n-octyl group, an isooctyl group, a 2-ethylhexyl group, an n-nonyl group, an isononyl group, an n-decyl group and an isodecyl group, further preferably at least one selected from the group consisting of an n-octyl group, an isooctyl group, a 2-ethylhexyl group, an n-nonyl group, and an isononyl group, and most preferably at least one selected from the group consisting of an n-octyl group, an isooctyl group, and a 2-ethylhexyl group.

The polyimide resin (A) preferably contains only a chain aliphatic group having 5 to 14 carbon atoms, besides a terminal amino group and a terminal carboxy group, at the end thereof from the viewpoint of heat aging resistance. When a group, besides the above groups, is contained at the end, the content thereof with respect to the chain aliphatic group having 5 to 14 carbon atoms is preferably 10 mol % or less and more preferably 5 mol % or less.

The content of the chain aliphatic group having 5 to 14 carbon atoms in the polyimide resin (A) is preferably 0.01 mol % or more, more preferably 0.1 mol % or more, and further preferably 0.2 mol % or more based on the total 100 mol % of the total repeating structural units constituting the polyimide resin (A) from the viewpoint of exerting excellent heat aging resistance. In order that a sufficient molecular weight is ensured and good mechanical properties are achieved, the content of the chain aliphatic group having 5 to 14 carbon atoms in the polyimide resin (A) is preferably 10 mol % or less, more preferably 6 mol % or less and further preferably 3.5 mol % or less based on the total 100 mol % of the total repeating structural units constituting the polyimide resin (A).

The content of the chain aliphatic group having 5 to 14 carbon atoms in the polyimide resin (A) can be determined by depolymerization of the polyimide resin (A).

The polyimide resin (A) preferably has a melting point of 360° C. or less and a glass transition temperature of 150° C. or more. The melting point of the polyimide resin (A) is more preferably 280° C. or more and further preferably 290° C. or more from the viewpoint of heat resistance, and is preferably 345° C. or less, more preferably 340° C. or less, and further preferably 335° C. or less from the viewpoint of exerting high molding processability. In addition, the glass transition temperature of the polyimide resin (A) is more preferably 160° C. or more and more preferably 170° C. or more from the viewpoint of heat resistance, and is preferably 250° C. or less, more preferably 230° C. or less, and further preferably 200° C. or less from the viewpoint of exerting high molding processability.

Both the melting point and the glass transition temperature of the polyimide resin (A) can be measured by a differential scanning calorimeter.

In addition, in the polyimide resin (A), the exothermic amount (hereinafter, also simply referred to as "exothermic amount of crystallization") of the crystallization exothermic peak observed in melting and then cooling of the polyimide resin (A) at a cooling rate of 20° C./min with differential scanning calorimetric measurement is preferably 5.0 mJ/mg or more, more preferably 10.0 mJ/mg or more, and further preferably 17.0 mJ/mg or more from the viewpoint of enhancement of crystallinity, heat resistance, mechanical strength, and chemical resistance. The upper limit of the exothermic amount of crystallization of the polyimide resin (A) is not particularly limited, and is usually 45.0 mJ/mg or less.

Specifically, the melting point, the glass transition temperature, and the exothermic amount of crystallization of the polyimide resin (A) can be measured by the methods described in Examples.

The logarithmic viscosity of the polyimide resin (A) at 30° C. in a 5 mass % concentrated sulfuric acid solution is preferably 0.2 to 2.0 dL/g and more preferably 0.3 to 1.8 dL/g. When the logarithmic viscosity is 0.2 dL/g or more, a molded article formed of the polyimide resin composition obtained has sufficient mechanical strength, and when the logarithmic viscosity is 2.0 dL/g or less, molding processability and handleability are good. The logarithmic viscosity $\mu$ is obtained according to the following expression by measuring the elapsed times for flowing concentrated sulfuric acid and the polyimide resin solution at 30° C. with a Cannon-Fenske viscometer.

$\mu = \ln(t_s/t_0)/C$ $t_0$: elapsed time for flowing concentrated sulfuric acid
$t_s$: elapsed time for flowing polyimide resin solution
C: 0.5 (g/dL)

The weight average molecular weight Mw of the polyimide resin (A) is preferably in the range of 10,000 to 150,000, more preferably 15,000 to 100,000, further preferably 20,000 to 80,000, still further preferably 30,000 to 70,000, and still further preferably 35,000 to 65,000. When the weight average molecular weight Mw of the polyimide resin (A) is 10,000 or more, the mechanical strength of a molded article obtained is good, when the Mw is 40,000 or more, the mechanical strength stability is good, and when the Mw is 150,000 or less, the molding processability is good.

The weight average molecular weight of the polyimide resin (A) can be measured by a gel permeation chromatography (GPC) method using polymethyl methacrylate (PMMA) as a standard sample.

(Method for Producing Polyimide Resin (A))

The polyimide resin (A) may be produced by reacting a tetracarboxylic acid component and a diamine component. The tetracarboxylic acid component contains a tetracarboxylic acid containing at least one aromatic ring and/or a derivative thereof, and the diamine component contains a diamine containing at least one alicyclic hydrocarbon structure and a chain aliphatic diamine.

The tetracarboxylic acid containing at least one aromatic ring is preferably a compound having four carboxy groups that are bonded directly to the aromatic ring, and may contain an alkyl group in the structure thereof. The tetracarboxylic acid preferably has 6 to 26 carbon atoms. Preferred examples of the tetracarboxylic acid include pyromellitic acid, 2,3,5,6-toluenetetracarboxylic acid, 3,3',4,4'-benzophenonetetracarboxylic acid, 3,3',4,4'-biphenyltetracarboxylic acid and 1,4,5,8-naphthalenetetracarboxylic acid. Among these, pyromellitic acid is more preferred.

Examples of the derivative of the tetracarboxylic acid containing at least one aromatic ring include an anhydride and an alkyl ester compound of a tetracarboxylic acid containing at least one aromatic ring. The derivative of the tetracarboxylic acid preferably has 6 to 38 carbon atoms. Examples of the anhydride of the tetracarboxylic acid include pyromellitic monoanhydride, pyromellitic dianhydride, 2,3,5,6-toluenetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride and 1,4,5,8-naphthalenetetracarboxylic dianhydride. Examples of the alkyl ester compound of the tetracarboxylic acid include dimethyl pyromellitate, diethyl pyromellitate, dipropyl pyromellitate, diisopropyl pyromellitate, dimethyl 2,3,5,6-toluenetetracarboxylate, dimethyl 3,3',4,4'-diphenylsulfonetetracarboxylate, dimethyl 3,3',4,4'-benzophenonetetracarboxylate, dimethyl 3,3',4,4'-biphenyltetracarboxylate and dimethyl 1,4,5,8-naphthalenetetracarboxylate. The alkyl group in the alkyl ester compound of the tetracarboxylic acid preferably has 1 to 3 carbon atoms.

The tetracarboxylic acid containing at least one aromatic ring and/or the derivative thereof may be used as a sole compound selected from the aforementioned compounds or may be used as a combination of two or more compounds.

The diamine containing at least one alicyclic hydrocarbon structure preferably has 6 to 22 carbon atoms, and preferred examples thereof include 1,2-bis(aminomethyl)cyclohexane, 1,3-bis(aminomethyl)cyclohexane, 1,4-bis(aminomethyl)cyclohexane, 1,2-cyclohexanediamine, 1,3-cyclohexanediamine, 1,4-cyclohexanediamine, 4,4'-diaminodicyclohexylmethane, 4,4'-methylenebis(2-methylcyclohexylamine), carvone diamine, limonene diamine, isophorone norbornane diamine, bis(aminomethyl)tricyclo[5.2.1.0$^{2,6}$]decane, 3,3'-dimethyl-4,4'-diaminodicyclohexylmethane and 4,4'-diaminodicyclohexylpropane. These compounds may be used solely or may be used as a combination of two or more compounds selected therefrom. Among these, 1,3-bis(aminomethyl)cyclohexane is preferably used. A diamine containing an alicyclic hydrocarbon structure generally has conformational isomers, and the ratio of the cis isomer and the trans isomer is not particularly limited.

The chain aliphatic diamine may be in the form of either linear or branched chain, and has preferably 5 to 16 carbon atoms, more preferably 6 to 14 carbon atoms and further preferably 7 to 12 carbon atoms. The linear moiety having 5 to 16 carbon atoms may contain an ether bond in the course thereof. Preferred examples of the chain aliphatic diamine include 1,5-pentamethylenediamine, 2-methylpentane-1,5-diamine, 3-methylpentane-1,5-diamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,16-hexadecamethylenediamine, and 2,2'-(ethylenedioxy)bis(ethyleneamine).

The chain aliphatic diamine may be used as a sole compound or as a mixture of plural kinds thereof. Among these, a chain aliphatic diamine having 8 to 10 carbon atoms can be preferably used, and at least one selected from the group consisting of 1,8-octamethylenediamine and 1,10-decamethylenediamine can be particularly preferably used.

In the production of the polyimide resin (A), the molar ratio of the charged amount of the diamine containing at least one alicyclic hydrocarbon structure with respect to the total amount of the diamine containing at least one alicyclic hydrocarbon structure and the chain aliphatic diamine is preferably 20 to 70 mol %. The molar ratio is preferably 25 mol % or more, more preferably 30 mol % or more, further preferably 32 mol % or more, and is preferably 60 mol % or less, more preferably 50 mol % or less, further preferably less than 40 mol, and further preferably 35 mol % or less from the viewpoint of exerting high crystallinity.

The diamine component may contain a diamine containing at least one aromatic ring. The diamine containing at least one aromatic ring preferably has 6 to 22 carbon atoms, and examples thereof include o-xylylenediamine, m-xylylenediamine, p-xylylenediamine, 1,2-diethynylbenzenediamine, 1,3-diethynylbenzenediamine, 1,4-diethynylbenzenediamine, 1,2-diaminobenzene, 1,3-diaminobenzene, 1,4-diaminobenzene, 4,4'-diaminocliphenyl ether, 3,4'-diaminocliphenyl ether, 4,4'-diaminocliphenylmethane, α,α'-bis(4-aminophenyl)-1,4-diisopropylbenzene, α,α'-bis(3-aminophenyl)-1,4-diisopropylbenzene, 2,2-bis(4-(4-aminophenoxy)phenyl)propane, 2,6-diaminonaphthalene and 1,5-diaminonaphthalene.

The molar ratio of the charged amount of the diamine containing at least one aromatic ring with respect to the total amount of the diamine containing at least one alicyclic hydrocarbon structure and the chain aliphatic diamine is preferably 25 mol % or less. The lower limit thereof is not particularly limited but needs to exceed 0 mol %.

The molar ratio is preferably 5 mol % or more, and more preferably 10 mol % or more, from the viewpoint of enhancement of the heat resistance, and is preferably 20 mol % or less, and more preferably 15 mol % or less, from the viewpoint of maintenance of the crystallinity.

In addition, the molar ratio is preferably 12 mol % or less, more preferably 10 mol % or less, further preferably 5 mol % or less and still more preferably 0 mol % from the viewpoint of a decrease in coloration of the polyimide resin (A).

In the production of the polyimide resin (A), the charged amount ratio of the tetracarboxylic acid component and the diamine component is preferably from 0.9 to 1.1 mol of the diamine component per 1 mol of the tetracarboxylic acid component.

In the production of the polyimide resin (A), an end capping agent may be mixed in addition to the tetracarboxylic acid component and the diamine component. The end capping agent is preferably at least one selected from the group consisting of a monoamine compound and a dicarboxylic acid compound. The amount of the end capping agent to be used may be any amount as long as a desired amount of an end group can be introduced into the polyimide resin (A), and the amount is preferably 0.0001 to 0.1 mol, more preferably 0.001 to 0.06 mol, and further preferably 0.002 to 0.035 mol, per 1 mol of the tetracarboxylic acid and/or the derivative thereof.

Among these, the monoamine end capping agent is preferable as the end capping agent, and a monoamine containing a chain aliphatic group having 5 to 14 carbon atoms is more preferable and a monoamine containing a saturated linear aliphatic group having 5 to 14 carbon atoms is further preferable from the viewpoint of introduction of the chain aliphatic group having 5 to 14 carbon atoms into the end of the polyimide resin (A) for enhancement of heat aging resistance.

The end capping agent is particularly preferably at least one selected from the group consisting of n-octylamine, isooctylamine, 2-ethylhexylamine, n-nonylamine, isononylamine, n-decylamine, and isodecylamine, further preferably at least one selected from the group consisting of n-octylamine, isooctylamine, 2-ethylhexylamine, n-nonylamine, and isononylamine, and most preferably at least one selected from the group consisting of n-octylamine, isooctylamine, and 2-ethylhexylamine.

As a polymerization method for producing the polyimide resin (A), a known polymerization method may be applied, and the method described in WO2016/147996 may be employed.

<Fatty Acid Metal Salt (B)>

The polyimide resin composition of the present invention contains the polyimide resin (A) described above and a fatty acid metal salt (B), the fatty acid metal salt (B) being composed of a fatty acid having 12 to 36 carbon atoms and optionally having a hydroxy group and at least one metal selected from the group consisting of an alkali metal, an alkaline earth metal, and a transition metal.

Accordingly, there can be provided a polyimide resin composition having good molding processability and heat resistance and developing good releasability even when subjected to heat molding (e.g., injection molding) under heating conditions of 300° C. or more.

The fatty acid constituting the fatty acid metal salt (B) has 12 to 36 carbon atoms, preferably 16 to 36 carbon atoms, more preferably 16 to 34 carbon atoms, and further preferably 26 to 32 carbon atoms, from the viewpoint of achievement of an effect of developing good releasability.

In the case where the number of carbon atoms of the fatty acid is less than the above range (less than 12), the fatty acid metal salt (B) lacks heat resistance. When the polyimide resin composition as the molding material is subjected to heat molding (e.g., injection molding) under heating conditions of 300° C. or more, the fatty acid metal salt (B) may be easily decomposed, and thus, good releasability may be unlikely to be developed.

Meanwhile, in the case where the number of carbon atoms of the fatty acid exceeds the above range (exceeds 36), a fatty acid as the raw material of the fatty acid metal salt (B) may be difficult to obtain.

The fatty acid constituting the fatty acid metal salt (B) may be an unsaturated fatty acid or a saturated fatty acid, and a saturated fatty acid is preferable because an effect of developing good releasability is easily achieved.

Examples of a fatty acid having no hydroxyl group constituting the fatty acid metal salt (B) include lauric acid (C12), tridecyl acid (C13), myristic acid (C14), pentadecyl acid (C15), palmitic acid (C16), margaric acid (C17), stearic acid (C18), nonadecyl acid (C19), arachidic acid (C20), heneicosylic acid (C21), behenic acid (C22), tricosylic acid (C23), lignoceric acid (C24), cerotic acid (C26), montanic acid (C28), melissic acid (C30), and dotriacontanoic acid (C32).

Among these fatty acids having no hydroxyl group, because of a high effect of developing good releasability, palmitic acid (C16), stearic acid (C18), behenic acid (C22), and montanic acid (C28) is preferable, and in particular, montanic acid (C28) is more preferable.

Examples of a fatty acid having a hydroxyl group constituting the fatty acid metal salt (B) include 12-hydroxystearic acid, hydroxycapric acid, hydroxylauric acid, hydroxymyristic acid, hydroxypalmitic acid, hydroxystearic acid, hydroxybehenic acid, and hydroxylignoceric acid.

Among these fatty acids having a hydroxyl group, because of a high effect of developing good releasability, 12-hydroxystearic acid, hydroxystearic acid, hydroxybehenic acid, and hydroxylignoceric acid are preferable.

Examples of a metal constituting the fatty acid metal salt (B) include alkali metals such as lithium, sodium, potassium, rubidium, cesium, and francium; alkaline earth metals such as beryllium, magnesium, calcium, strontium, barium, and radium; and transition metals such as scandium, titanium, vanadium, chromium, manganese, iron, cobalt, nickel, and copper.

Among these metals, at least one selected from the group consisting of alkali metals and alkaline earth metals is preferable because of a high effect of developing good releasability. Further, alkaline earth metals are more preferable, among these, calcium is preferable because a molded article having a small change in the hue and also being excellent in glossiness and mechanical strength is easily obtained.

A 5% weight loss temperature ($T_{d5}$) by thermogravimetric analysis (TGA) of the fatty acid metal salt (B) is preferably 230 to 550° C., more preferably 240 to 500° C., and further preferably 280 to 370° C. under air atmospheric conditions and is preferably 250 to 600° C., more preferably 260 to 550° C., and further preferably 300 to 450° C. under nitrogen atmospheric conditions.

When the 5% weight loss temperature ($T_{d5}$) falls within the above range, a molded article that develops good releasability, has a small change in the hue, and is also excellent in glossiness and mechanical strength is easily obtained.

An air gas flow rate in an air atmosphere is not particularly limited and is preferably 20 to 90 mL/min, more preferably 30 to 80 mL/min, and further preferably 40 to 70 mL/min.

A nitrogen gas flow rate in a nitrogen atmosphere is not particularly limited and is preferably 60 to 140 mL/min, more preferably 70 to 130 mL/min, and further preferably 80 to 120 mL/min.

Usually, with a higher 5% weight loss temperature ($T_{d5}$), pyrolysis of the fatty acid metal salt (B) is believed to be unlikely to occur. However, the present inventors have found, based on their investigation, that an effect of developing good releasability is enhanced even when the 5% weight loss temperature ($T_{d5}$) is relatively low (see Examples described below).

The 5% weight loss temperature ($T_{d5}$) can be determined by measurement with a method set forth in Examples described below.

"Having a small change in the hue" herein refers to the change in the hue being small when the hue of a polyimide resin composition containing no fatty acid metal salt (B) is compared with the hue of a polyimide resin composition containing a fatty acid metal salt (B).

Specifically, the YI value and whiteness of a polyimide resin composition containing no fatty acid metal salt (B) are compared with the YI value and whiteness of a polyimide resin composition containing a fatty acid metal salt (B). When the difference between the YI values and the difference between the whiteness are both smaller, the change in the hue can be evaluated as smaller.

The YI value and whiteness can be determined by measurement with a method set forth in Examples described below.

The melting point of the fatty acid metal salt (B) is preferably 120 to 300° C., more preferably 120 to 280° C., and further preferably 120 to 250° C.

When the melting point falls within the above range, a molded article that develops good releasability, has a small change in the hue, and is also excellent in glossiness and mechanical strength is easily obtained.

The melting point is a value determined by differential scanning calorimetric measurement (DSC) according to JIS K7121:2012.

The metal content of the fatty acid metal salt (B) is preferably 0.5 to 10 mass %, more preferably 0.5 to 8 mass %, and further preferably 0.5 to 6 mass %.

When the metal content falls within the above range, a molded article that develops good releasability, has a small change in the hue, and is also excellent in glossiness and mechanical strength is easily obtained.

The metal content is a value determined by conducting qualitative and quantitative analysis on the metal using an inductively coupled plasma optical emission spectrometer (ICP-OES).

The content of the fatty acid metal salt (B) in the polyimide resin composition is preferably 0.05 to 20 mass %, more preferably 0.1 to 10 mass %, further preferably 0.1 to 7 mass %, still preferably 0.15 to 5 mass %, and still further preferably 0.15 to 3 mass %.

When the content of the fatty acid metal salt (B) falls within the above range, a molded article that develops good releasability, has a small change in the hue, and is also excellent in glossiness and mechanical strength is easily obtained.

The fatty acid metal salt (B) may be produced by a known method. Examples of a commercially available fatty acid metal salt include "CS-3" (Ca laurate), "ZS-3" (Zn laurate), "BS-3" (Ba laurate), "LS-3" (Li laurate), "NS-3A" (Na/K laurate), "CS-7" (Ca behenate), "ZS-7" (Zn behenate), "MS-7" (Mg behenate), "LS-7" (Li behenate), "NS-7" (sodium behenate), "KS-7" (K behenate), "CS-8CP" (Ca montanate), "ZS-8" (Zn montanate), "MS-8" (Mg montanate), "AS-8" (Al montanate), "LS-8" (Li montanate), "NS-8" (Na montanate), "KS-8" (K montanate), and "HRC-12" (composite alkaline soap) produced by Nitto Kasei Kogyo K.K.; and "Calcium stearate G", "Calcium stearate GP", "Calcium stearate GF-200", "Zinc stearate G", "Zinc stearate GP", "Zinc stearate GF-200", "Zinc behenate", "Magnesium stearate G", "Magnesium stearate GR", "Magnesium stearate GP", "Magnesium stearate GF-200", and "Barium stearate GF" produced by NOF CORPORATION.

<Filler (C)>

The polyimide resin composition of the present invention may contain a filler (C) from the viewpoint of enhancement of the heat resistance and mechanical strength. The shape of the filler (C) is not particularly limited, and any of particulate, plate-like and fibrous fillers may be used.

The particle size of the particulate or plate-like filler may be appropriately selected according to the use application and the like of the polyimide resin composition, and the average particle size is preferably 0.1 to 200 μm and more preferably 0.5 to 100 μm, from the viewpoint of enhancement of the molding processability of the polyimide resin composition and the mechanical strength of a molded article.

The average fiber diameter of the fibrous filler is preferably 1 to 100 μm, more preferably 3 to 50 μm, and further preferably 4 to 20 µm, from the viewpoint of enhancement of the molding processability of the polyimide resin composition and the mechanical strength of a molded article.

The average fiber diameter of the fibrous filler can be determined by randomly selecting, observing, and measuring 50 or more fibers under a scanning electron microscope (SEM) and calculating the number-average fiber diameter of the fibers.

The form of the fibrous filler is not particularly limited, either of staple fiber and continuous fiber may be used, and both the fibers may be used in combination.

When the fibrous filler is staple fiber, the average fiber length thereof is preferably less than 10 mm, more preferably 0.5 to 8 mm, and further preferably 2 to 8 mm, from the viewpoint of enhancement of the molding processability of the polyimide resin composition and the mechanical strength of a molded article.

The average fiber length of the fibrous filler can be determined by randomly selecting, observing, and measuring 50 or more fibers under a scanning electron microscope (SEM) and calculating the number-average fiber length of the fibers.

When the fibrous filler is continuous fiber, examples include monofilaments or multifilament simply arranged in one direction or intercrossed, a fabric, such as a knit fabric, a non-woven fabric, and a mat.

When the fibrous filler is continuous fiber, the fineness is preferably 20 to 4,500 tex and more preferably 50 to 4,000 tex. The fineness may be determined in terms of weight per 1,000 m by determining the weight of the continuous fiber having an arbitrary length.

Any of inorganic and organic fillers may be used as the filler (C), and an inorganic filler is preferred, from the viewpoint of enhancement of the heat resistance and mechanical strength. The filler (C) is preferably at least one selected from the group consisting of a particulate or plate-like inorganic filler (C1) and a fibrous inorganic filler (C2).

The particulate or plate-like inorganic filler (C1) is suitably used in consideration that the filler is caused to serve as a crystal nucleating agent in the polyimide resin composition to thereby enhance heat resistance and mechanical strength. Examples of the particulate or plate-like inorganic filler (C1) include silica, alumina, kaolinite, wollastonite, mica, talc, clay, sericite, magnesium carbonate, barium carbonate, magnesium sulfate, barium sulfate, calcium oxide, silicon carbide, antimony trisulfide, tin sulfide, copper sulfide, iron sulfide, bismuth sulfide, zinc sulfide, and glass. Among these, talc is preferred.

The above glass may be a glass powder, a glass flake, and glass beads.

The fibrous inorganic filler (C2) is suitably used from the viewpoint of enhancement of the heat resistance and mechanical strength. Examples of the fibrous inorganic filler (C2) include glass fiber, carbon fiber, metal fiber, graphite fiber, silica fiber, silica-alumina fiber, alumina fiber, zirconia fiber, boron nitride fiber, silicon nitride fiber, boron fiber, potassium titanate whisker, aluminum borate whisker, magnesium-based whisker, and silicon-based whisker. Among these, glass fiber and carbon fiber are preferred.

These inorganic fillers may also be surface-treated.

The content of the particulate or plate-like inorganic filler (C1) in the polyimide resin composition is preferably 0.05 to 15 mass %, more preferably 0.1 to 10 mass %, and further preferably 0.2 to 5 mass %.

The content of the fibrous inorganic filler (C2) in the polyimide resin composition is preferably 10 to 80 mass %, more preferably 15 to 80 mass %, further preferably 20 to 70 mass %, and still further preferably 30 to 60 mass %.

<Additive>

In the polyimide resin composition of the present invention, additives may be mixed as required, such as a delusterant, a plasticizer, an antistatic agent, an anti-coloring agent, an anti-gelling agent, a colorant, an antioxidant, a conducting agent, and a resin-modifying agent.

The amount of the above additive mixed is not particularly limited, and usually 50 mass % or less, preferably 0.0001 to 30 mass %, more preferably 0.001 to 15 mass %, and further preferably 0.01 to 10 mass % in the polyimide resin composition in consideration that the physical properties derived from the polyimide resin (A) are maintained and the effect of the additive is exerted.

Another resin other than the polyimide resin (A) may also be mixed in the polyimide resin composition of the present invention, without impairing the characteristics of the composition. Such another resin is preferably a high heat resistant thermoplastic resin, and examples thereof include a polyamide resin, a polyester resin, a polyimide resin other than the polyimide resin (A), a polycarbonate resin, a polyetherimide resin, a polyamideimide resin, a polyphenylene ether imide resin, a polyphenylene sulfide resin, a polsulfone resin, a polyethersulfone resin, a polyallylate resin, a liquid crystal polymer, a polyether ether ketone resin, a polyether ketone resin, a polyether ketone ketone resin, a polyether ether ketone ketone resin, and a polybenzoimidazole resin. Among these, one or more selected from the group consisting of a polyether imide resin, a polyphenylene sulfide resin, and a polyether ether ketone resin are preferable from the viewpoint of heat resistance, molding processability, strength and solvent resistance.

When the polyimide resin (A) is used in combination with another resin, the rate of such another resin to be mixed is not particularly limited, without impairing the characteristics of the polyimide resin composition.

However, the total content of the polyimide resin (A) and the fatty acid metal salt (B) in the polyimide resin composition of the present invention is preferably 20 mass % or more, more preferably 45 mass % or more, further preferably 70 mass % or more, and still further preferably 80 mass % or more from the viewpoint of achievement of the effect of the present invention. The upper limit thereof is 100 mass %.

The polyimide resin composition of the present invention may have any form but is preferably pellets.

The polyimide resin composition of the present invention and the polyimide resin (A) to be used therefor have thermoplasticity. Thus, for example, the polyimide resin (A), the fatty acid metal salt (B), and various arbitrary components, if necessary, are added and dry blended. Thereafter, the resulting mixture is melt-kneaded in an extruder, the melt-kneaded product is extruded into a strand, and the strand can be cut into pellets. The pellets may be introduced in various kinds of molding machines and heat-molded by a method described below, thereby easily producing a molded article having a desired shape.

[Molded Article]

The present invention provides a molded article including the polyimide resin composition.

Since the polyimide resin composition of the present invention has thermoplasticity, the molded article of the present invention can be easily produced also by heat-molding the polyimide resin composition. Examples of the heat molding method include injection molding, extrusion molding, blow molding, heat press molding, vacuum molding, pneumatic molding, laser molding, welding, and heat adhesion, and the polyimide resin composition of the present invention may be molded by any molding method that includes a heat melting step. Among these, injection molding is preferably performed because such molding can be performed at a relatively low temperature without the molding temperature and the mold temperature in molding being set at temperatures higher than those in the case where a common thermoplastic polyimide resin is used as the raw material. For example, injection molding can be performed at a molding temperature of 400° C. or less and a mold temperature of 220° C. or less.

The method for producing a molded article preferably includes the step of heat-molding the polyimide resin composition at from 300 to 400° C. Examples of specific procedures include the following method.

First, the fatty acid metal salt (B) and various arbitrary components, if necessary, are added to the polyimide resin (A) and dry blended. Thereafter, the resulting mixture is introduced into an extruder and melted preferably at from 300 to 400° C. The melted product is melt-kneaded in the extruder and extruded, thereby producing the pellets. Alternatively, the polyimide resin (A) may be introduced into an extruder and melted preferably at from preferably 300 to 400° C., and the fatty acid metal salt (B) and various arbitrary components may be introduced thereto, melt-kneaded with polyimide resin (A) in the extruder, and extruded, thereby preparing pellets.

The pellets may be dried, then introduced in various kinds of molding machines, and heat-molded preferably at from 300 to 400° C., thereby producing a molded article having a desired shape.

Since the polyimide resin composition of the present invention may be heat-molded by extrusion molding or the like at a relatively low temperature of from 300 to 400° C., the polyimide resin composition is excellent in molding processability and may be easily produced into a molded product having a desired shape. The temperature of the heat molding is preferably from 300 to 400° C.

According to the polyimide resin composition of the present invention, the molding processability and heat resistance are good, and particularly when the composition is subjected to heat molding (e.g., injection molding or the like) at 300° C. or more, the releasability is excellent.

The polyimide resin composition of the present invention can be applied in, for example, various industrial members for automobiles, railway, aviation, and the like, members for household electrical products, or enclosures therefor and the like. Specifically, the polyimide resin composition can be applied in gears, bearings, cutting members, screws, nuts, packings, IC sockets for inspection, belts, covering materials for electrical wire and the like, cover-lay films, members for semiconductor manufacturing apparatuses, medical instruments, covering materials for fishing rods, reels, and the like, stationery, and the like.

EXAMPLES

The present invention will be described in more detail with reference to examples below, but the present invention is not limited thereto. Various measurements and evaluations in each Production Example, Example, and Comparative Example were carried out in the following manners.

(1) Measurement on Polyimide Resin (A)
(1-1) Infrared Spectroscopy (IR Measurement)

The IR measurement of the polyimide resin 1 obtained in Production Example 1 described below was performed with "JIR-WINSPEC 50", produced by JEOL, Ltd.

(1-2) Logarithmic Viscosity μ

The polyimide resin was dried at from 190 to 200° C. for 2 hours, and then 0.100 g of the polyimide resin was dissolved in 20 mL of concentrated sulfuric acid (96%, produced by Kanto Chemical Co., Inc.) to form a polyimide resin solution, and the measurement was made at 30° C. with a Cannon-Fenske viscometer using the polyimide resin solution as a measurement sample. The logarithmic viscosity μ was obtained according to the following expression.

$\mu = \ln(ts/t_0)/C$ $t_0$: elapsed time for flowing concentrated sulfuric acid
$ts$: elapsed time for flowing polyimide resin solution
C: 0.5 g/dL (1-3) Melting Point, Glass Transition Temperature, Crystallization Temperature, and Exothermic Amount of Crystallization The melting point (Tm), the glass transition temperature (Tg), the crystallization temperature (Tc), and the exothermic amount of crystallization (ΔHm) of the polyimide resin 1 obtained in Production Example 1 described below were measured with a differential scanning calorimeter ("DSC-6220", produced by SII Nanotechnology, Inc.).

The polyimide resin was subjected to the following thermal history in a nitrogen atmosphere. The condition of the thermal history included the first heating (heating rate: 10° C./min), then cooling (cooling rate: 20° C./min), and then second heating (heating rate: 10° C./min).

The melting point (Tm) was determined by reading the peak top value of the endothermic peak observed in the second heating. The glass transition temperature (Tg) was determined by reading the value observed in the second heating. The crystallization temperature (Tc) was determined by reading the peak top value of the exothermic peak observed in cooling.

The exothermic amount of crystallization ΔHm (mJ/mg) was calculated from the area of the exothermic peak observed in cooling.

(1-4) Crystallization Half-Time

The crystallization half-time of the polyimide resin 1 obtained in Production Example 1 described below was measured with a differential scanning calorimeter ("DSC-6220", produced by SII Nanotechnology, Inc.).

In a nitrogen atmosphere, a polyimide resin was held at 420° C. for 10 minutes for melting the polyimide resin completely and then quenched at a cooling rate of 70° C./min, during which the time required from the appearance of the crystallization peak observed to the peak top thereof was calculated. In Table 1, the case where the crystallization half-time was 20 seconds or less was denoted by "<20".

(1-5) Weight Average Molecular Weight

The weight average molecular weight (Mw) of the polyimide resin 1 obtained in Production Example 1 described below was measured with a gel permeation chromatography (GPC) measurement apparatus "Shodex GPC-101" produced by Showa Denko K.K. under the following conditions:

Column: Shodex HFIP-806M
Mobile phase solvent: HFIP containing 2 mM sodium trifluoroacetate
Column temperature: 40° C.
Flow rate of mobile phase: 1.0 mL/min
Specimen concentration: about 0.1 mass %

Detector: IR detector
Amount of injection: 100 μm
Calibration curve: standard PMMA (2) Measurement on Fatty Acid Metal Salt (B)

(2-1) 5% weight loss temperature ($T_{d5}$)

For the 5% weight loss temperature ($T_{d5}$) of the fatty acid metal salt (B), a specimen of about 10 mg was used as the subject, and a thermogravimetric analysis apparatus ("TG/DTA6200" produced by Seiko Instruments Inc.) was used.

When the fatty acid metal salt (B) was heated from normal temperature to 450° C. under a condition of heating rate: 10° C./min, a temperature at which the specimen decreased by 5% by weight based on 100% by weight of the specimen at 100° C. was determined by measurement.

The heating was performed each under a condition of an air gas flow rate of 50 mL/min in an air atmosphere and a condition of a nitrogen gas flow rate of 100 mL/min in a nitrogen atmosphere.

(3) Evaluation on Polyimide Resin Composition (3-1) Hue

Pellets of the polyimide resin composition obtained in each Example described below were used for measurement.

The Lab value and the YI value were measured by a reflection method with a differential colorimeter ("ZE2000", produced by Nippon Denshoku Kogyo Industries Co., Ltd.). The whiteness was calculated based on the Lab value and the YI value.

The Lab value and the YI value were measured by a method according to JIS Z8781-4:2013 and a method according to JIS K7373:2006, respectively. The whiteness was measured by a method according to JIS Z8715:1999.

<Evaluation of YI Value>

The YI value was evaluated in accordance with the following criteria.

G: The YI value of each Example is in the range of ±5 with respect to the YI value of Comparative Example 1, which is made only of the polyimide resin 1.

F: The YI value of each Example is out of the range of ±5 with respect to the YI value of Comparative Example 1, which is made only of the polyimide resin 1.

<Evaluation of Whiteness>

The whiteness was evaluated in accordance with the following criteria.

G: The whiteness of each Example is in the range of ±5 with respect to the whiteness of Comparative Example 1, which is made only of the polyimide resin 1.

F: The whiteness of each Example is out of the range of ±5 with respect to the whiteness of Comparative Example 1, which is made only of the polyimide resin 1.

<Evaluation of Change in Hue>

The change in the hue was evaluated in accordance with the following criteria.

G: In the case where both the YI value and the whiteness of each Example were evaluated as "G", the change in the hue was evaluated as being small on the basis of that of Comparative Example 1, which is made only of the polyimide resin 1.

F: In the case where both the YI value and the whiteness of each Example were evaluated as "F", the change in the hue was evaluated as being large on the basis of that of Comparative Example 1, which is made only of the polyimide resin 1.

(4) Evaluation on Molded Article (4-1) Glossiness

A molded article of 170 mm×20 mm×4 mm in thickness obtained in each Example described below was cut to prepare a molded article of 80 mm×10 mm×4 mm in thickness, which was used for measurement.

The 60° glossiness (incident angle: 60°, light-receiving angle: 60°) of the molded article produced in each Example as the specimen was measured with a gloss meter ("VG-2000" produced by Nippon Denshoku Industries Co., Ltd.) by a method according to JIS K5101-5-3:2004.

The 60° glossiness was evaluated in accordance with the following criteria.

G: The 60° glossiness is in the range of ±5 GU with respect to the 60° glossiness value of Comparative Example 1, which is made only of the polyimide resin 1.

F: The 60° glossiness is out of the range of ±5 GU with respect to the 60° glossiness value of Comparative Example 1, which is made only of the polyimide resin 1.

(4-2) Bending Strength and Flexural Modulus

A molded article of 170 mm×20 mm×4 mm in thickness obtained in each Example described below was cut to prepare a molded article of 80 mm×10 mm×4 mm in thickness, which was used for measurement.

The bending test was performed with Bend Graph (produced by Toyo Seiki Seisaku-Sho, Ltd.) according to ISO 178 at room temperature (23° C.) and under conditions of a test speed of 2 mm/min to measure the bending strength and the flexural modulus.

(4-3) Heat Deformation Temperature (HDT)

A molded article of 170 mm×20 mm×4 mm in thickness obtained in each Example described below was cut to prepare a molded article of 80 mm×10 mm×4 mm in thickness, which was used for measurement.

A HDT tester "Auto-HDT3D-2" (produced by Toyo Seiki Seisaku-sho, Ltd.) was used to measure the heat deformation temperature under conditions including a distance between supports of 64 mm, a load of 1.80 MPa, and a heating rate of 120° C./hour.

(4-4) Releasability

A molded article was prepared in a mold in each Example described below. This molded article was prepared in the same manner 20 times, and the number of times at which the molded article adhered to the removable mold and were not separated therefrom (number of times of adhering/20 times) in 5. Mold opening and removal step was counted. Further, a force sufficient to eliminate the adhering was applied on the molded article that adhered to the removable mold and was not separated therefrom to thereby detach the molded article. The molded articles prepared 20 times were visually observed, and the number of times at which a warp of 10° or more (deformation) occurred in the molded articles (number of times of deformation/20 times) was counted.

The molded articles prepared 20 times in each Example were obtained by conducting injection at a fixed injection speed so as to achieve an injection time of 2±0.03 seconds and a cushion volume of 2 to 5 mm in 3. Injection step and conducting ejection at a fixed ejection speed both for the first time and the second time in 5. Mold opening and removal step. In other words, the 20 molded articles prepared in each Example were obtained under the same production conditions as much as possible.

Thus, the warp of 10° or more (deformation) that occurred in the molded article is attributable to the force applied for detaching the molded article adhering to the movable mold. The larger the degree of the adhering, the larger the force required for detaching.

<Evaluation of Number of Times of Adhering>

Among the molded articles prepared 20 times, the number of times at which the molded article adhered to the movable mold and was not separated therefrom (number of times of adhering/20 times) was evaluated in accordance with the following criteria.

A: The number of times of adhering is less than 10.

B: The number of times of adhering is 10 or more and less than 15.

C: The number of times of adhering is 15 or more.

<Evaluation of Number of Times of Deformation>

Among the molded articles prepared 20 times, the number of times at which a warp of 10° or more occurred in the molded article (number of times of deformation/20 times) was evaluated in accordance with the following criteria.

A: The number of times of deformation is 0.

B: The number of times of deformation is 1 or more and less than 2.

C: The number of times of deformation is 2 or more.

filtered. The obtained polyimide resin powder was washed with 300 g of 2-(2-methoxyethoxy)ethanol and 300 g of methanol, filtered, and then dried at 180° C. for 10 hours with a drier, thereby providing 317 g of a powder of polyimide resin 1.

The measurement of the IR spectrum of polyimide resin 1 showed the characteristic absorption of an imide ring $\nu(C=O)$ observed at 1768 and 1697 $(cm^{-1})$. The logarithmic viscosity was 1.30 dL/g, Tm was 323° C., Tg was 184° C., Tc was 266° C., the exothermic amount of crystallization was 21.0 mJ/mg, the crystallization half-time was 20 seconds or less, and Mw was 55,000.

The composition and evaluation results of the polyimide resin 1 in Production Example 1 are shown in Table 1. The values expressed in mol % of the tetracarboxylic acid component and the diamine component in Table 1 are values calculated from the charged amount of each component in production of the polyimide resin.

TABLE 1

| | | Tetracarboxylic acid component (mol % in the total tetracarboxylic acid component) | Diamine component (mol % in the total diamine component) | | (1)/{(1) + (2)} | Tm | Tg | Tc | Exothermic amount of crystallization | Crystallization half-time | |
|---|---|---|---|---|---|---|---|---|---|---|---|
| | | PMDA | 1,3-BAC | OMDA | (mol %)*1 | (° C.) | (° C.) | (° C.) | ΔHm (mJ/mg) | (second) | Mw |
| Production Example 1 | Polyimide resin 1 | 100 | 35 | 65 | 35 | 323 | 184 | 266 | 210 | <20 | 55,000 |

*1 The content ratio of the repeating structural unit of the formula (1) in the polyimide resin 1 (mol %) with espect to the total of the repeating structural unit of the formula (1) and the repeating structural unit of the formula (2)

[Production Example 1] Production of Polyimide Resin 1

500 g of 2-(2-methoxyethoxy)ethanol (produced by Nippon Nyukazai Co., Ltd.) and 218.12 g (1.00 mol) of pyromellitic dianhydride (produced by Mitsubishi Gas Chemical Company, Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 49.79 g (0.35 mol) of 1,3-bis(aminomethyl) cyclohexane (produced by Mitsubishi Gas Chemical Company, Inc., cis/trans ratio=7/3) and 93.77 g (0.65 mol) of 1,8-octamethylenediamine (produced by Kanto Chemical Co., Inc.) were dissolved in 250 g of 2-(2-methoxyethoxy) ethanol with a 500 mL beaker, thereby preparing a mixed diamine solution. This mixed diamine solution was added gradually with a plunger pump. Heat was generated due to the drop addition, but the internal temperature was adjusted to be within the range of 40 to 80° C. The dropwise addition of the mixed diamine solution was carried out in a nitrogen flow state over the whole period. The number of rotations of the agitation blade was set to 250 rpm. After the completion of the dropwise addition, 130 g of 2-(2-methoxyethoxy) ethanol and 1.284 g (0.010 mol) of n-octylamine (produced by Kanto Chemical Co., Inc.) as an end capping agent were added thereto, and the mixture was further agitated. At this stage, a pale yellow polyamic acid solution was obtained. Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 120 to 140° C. The solution was kept at 190° C. for 30 minutes, then allowed to cool to room temperature, and Abbreviations in the Table 1 are as follows.
PMDA; pyromellitic dianhydride
1,3-BAC; 1,3-bis(aminomethyl)cyclohexane
OMDA; 1,8-octamethylenediamine Examples 1 to 7 and Comparative Example 1

<Production of Pellets of Polyimide Resin Composition>

The polyimide resin 1 obtained in Production Example 1 and the components each shown in Table 2 at each rate mixed were sufficiently mixed therewith by dry blend. The resulting mixed powder was extruded into a strand at a barrel temperature of 350° C. and a screw rotation speed of 70 rpm with Labo Plasto Mill (produced by Toyo Seiki Seisaku-Sho, Ltd.). A strand extruded from the extruder was cooled in air and then pelletized by cutting with a pelletizer ("Fan Cutter FC-Mini-4/N", produced by Hoshi Plastic Co., Ltd.).

The obtained pellets of the polyimide resin composition (hereinafter, simply also referred to as "pellets") were dried at 150° C. for 12 hours.

The size of the obtained pellets were 3 to 4 mm in length and 2 to 3 mm in diameter.

The pellets of the polyimide resin composition obtained in each Example were used to perform the evaluation of (3-1) Hue of the polyimide resin composition described above, and the results thereof are shown in Table 2.

Examples 1 to 6 and Comparative Example 1

<Preparation of Molded Article>

For preparation of a molded article, an injection molding machine ("FANUC ROBOSHOT α-S30iA", produced by Fanuc Corporation)) was used.

The "injection molding machine" used here is composed of an "injection unit" that melts the molding material and infuses (injects) the melted molding material, and a "clamping unit" that closes the mold against the pressure of the molding material and performs ejection of a molded article.

The "injection unit" is a device including a "hopper" that feeds pellets as the molding material, a "cylinder" that heats the molding material with a heater to melt the material while a screw is rotated, and a "nozzle" that infuses (injects) the melted molding material in the mold. Meanwhile, the "clamping unit" is a device including a "movable mold" equipped with an ejector pin and a "fixed mold".

The pellets obtained in each Examples as the molding material were fed into the hopper (material feeding port) of the injection unit, and injection molding was performed through steps 1 to 5 described below according to K 7152-1:1999 to obtain a molded article of 170 mm×20 mm×4 mm in thickness.

1. Molding Material Weighing Step

The molding material fed through the hopper was melted by heating the cylinder with the heater while the screw of the injection unit was rotated, and an amount of the melted molding material required was reserved (weighed) in the front of the screw.

Screw diameter: 20 mm
Screw rotation speed: 150 rpm
Screw tip pressure (back pressure): 20 MPa
Cylinder temperature: nozzle 380° C., front portion 380° C., intermediate portion 380° C., rear portion 380° C., water cooling portion 90° C.
Weighing position: 75 mm 2. Mold Closing and Clamping Step The movable mold and the fixed mold were attached to the clamping unit. The movable mold was brought closer to the fixed mold to closes the molds, and the closed mold was clamped.

3. Injection Step

While the mold of the clamping unit was heated with a heater and the nozzle at the cylinder tip of the injection unit was brought into a close contact with the fixed mold, the melted molding material was infused (injected) into the mold.

During infusion of the molding material, the injection speed was controlled to be constant via the advance of the screw (speed control). After the molding material was infused, the pressure was controlled such that a constant pressure (holding pressure) was applied to the molding material (pressure control). Switching from speed control to pressure control was set to be made when the screw reached a predetermined position.

Mold heating temperature: 200° C.
Injection speed: 31.8 mm/sec, injection time: 2 seconds
Holding pressure: 60 MPa, holding pressure time: 12 seconds
Position switching: 12 mm
Cushion volume (the amount of molding material remaining in the cylinder after infusion of the molding material): 3 mm 4. Cooling Step The temperature of the mold was lowered to solidify the melted molding material in the mold by cooling to thereby prepare a molded article in the mold.

Mold cooling temperature: 200° C., cooling time: 20 seconds

5. Mold Opening and Removal Step

The mold was opened at a constant rate by bringing the movable mold including the molded article therein away from the fixed mold. When the mold was fully opened, the ejector pin of the movable mold was advanced at a constant rate to perform a first ejection. After held for a predetermined time, the ejector pin was further advanced at a constant rate to perform a second ejection. The molded article was dropped off and removed from the movable mold to thereby obtain the molded article of each of Examples 1 to 6 and Comparative Example 1.

Mold opening rate: 22.9 mm/s
First ejection rate: 4 mm/s
Amount of first ejection: 34 mm
Holding time: 0.3 seconds
Second ejection rate: 5 mm/s
Amount of second ejection: 4 mm Example 7

<Preparation of Molded Article>

Injection molding was performed in the same manner as in Examples 1 except that, in preparation of the molded article in Example 1, the conditions for 1. Molding material weighing step, 3. Injection step, and 4. Cooling step were changed as follows, and a molded article of 170 mm×20 mm×4 mm in thickness of Example 7 was obtained.

Cylinder temperature: nozzle 360° C., front portion 360° C., intermediate portion 360° C., rear portion 360° C., water cooling portion 90° C.
Injection speed: 30.8 mm/second
Holding pressure: 65 MPa, holding pressure time: 18 seconds
Position switching: 14 mm
Cushion volume (the amount of molding material remaining in the cylinder after infusion of the molding material): 4 mm
Mold cooling temperature: 200° C., cooling time: 25 seconds The molded article of 170 mm×20 mm×4 mm in thickness obtained in each Example was used to perform the evaluation of (4-4) Releasability described above, and the results thereof are shown in Table 2.

Meanwhile, a molded article of 80 mm×10 mm×4 mm in thickness prepared by cutting the molded article of 170 mm×20 mm×4 mm in thickness obtained in each Example was used to perform the evaluation of (4-1) Glossiness, (4-2) Bending strength and flexural modulus, and (4-3) Heat deformation temperature (HDT), and the results thereof are shown in Table 2.

TABLE 2

| | | | | | Example | | | | | | | Comparative Example |
|---|---|---|---|---|---|---|---|---|---|---|---|---|
| | | | | | 1 | 2 | 3 | 4 | 5 | 6 | 7 | 1 |
| Composition blend | (A) | (A1) Polyimide resin 1 | mass % | | 98.91 | 98.71 | 98.51 | 98.71 | 98.71 | 98.71 | 49.36 | 100 |
| | (B) | (B1) CS-8 CP Ca montanate (melting point 125 to 145° C.) | mass % | | 0.1 | 0.3 | 0.5 | | | | 0.15 | |

TABLE 2-continued

|  |  |  |  | Example 1 | Example 2 | Example 3 | Example 4 | Example 5 | Example 6 | Example 7 | Comparative Example 1 |
|---|---|---|---|---|---|---|---|---|---|---|---|
|  |  | (B2) NS-8 Na montanate (melting point: 200 to 220° C.) | mass % |  |  |  |  | 0.3 |  |  |  |
|  |  | (B3) LS-8 Li montanate (melting point: 200 to 210° C.) | mass % |  |  |  |  |  | 0.3 |  |  |
|  |  | (B4) HRC-12 Composite alkaline soap | mass % |  |  |  |  |  |  | 0.3 |  |
|  | (C) | (C1) Talc D-800 | mass % | 0.99 | 0.99 | 0.99 | 0.99 | 0.99 | 0.99 | 0.49 |  |
|  |  | (C2) Glass fiber T-786H | mass % |  |  |  |  |  |  | 50 |  |
|  |  | Total | mass % | 100 | 100 | 100 | 100 | 100 | 100 | 100 | 100 |
| Evaluation results | Basic physical properties | Hue | L | 39.7 | 40.8 | 41.3 | 30.6 | 30.7 | 24.3 | 45.0 | 37.2 |
|  |  |  | a | 6.4 | 6.4 | 6.4 | 2.7 | 3.6 | 0.9 | 4.3 | 7.4 |
|  |  |  | b | 15.3 | 15.6 | 15.5 | 9.4 | 10.1 | 6.1 | 14.5 | 13.8 |
|  |  | YI |  | 80.5 | 80.0 | 78.5 | 61.2 | 67.4 | 47.7 | 64.8 | 81.0 |
|  |  | YI evaluation |  | G | G | G | F | F | F | F | — |
|  |  | Whiteness |  | 37.5 | 38.4 | 38.9 | 29.9 | 29.9 | 24.1 | 42.9 | 35.3 |
|  |  | Whiteness evaluation |  | G | G | G | F | F | F | F | — |
|  |  | Evaluation of change in hue |  | G | G | G | F | F | F | F | — |
|  | Optical properties | 60° glossiness | GU | 85.9 | 91.4 | 89.4 | 94.5 | 88.4 | 88.1 | 22.3 | 90.9 |
|  |  | 60° glossiness evaluation |  | G | G | G | G | G | G | F | — |
|  | Mechanical properties | Flexural modulus | GPa | 2.5 | 2.6 | 2.5 | 2.7 | 2.9 | 2.8 | 15.3 | 2.4 |
|  |  | Bending strength | MPa | 115.1 | 108.9 | 115.8 | 119.6 | 121.9 | 122.1 | 251.3 | 112.9 |
|  | Thermal properties | Heat deformation temperature (HDT) | ° C. | 168.3 | 169.1 | 168.6 | 173.1 | 175.7 | 176.7 | 288.5 | 168.1 |
|  | Releasability | Number of times of adhering (/20 times) | Times | 12 | 2 | 0 | 3 | 0 | 10 | 0 | 18 |
|  |  | Evaluation of number of times of adhering | — | B | A | A | A | A | B | A | C |
|  |  | Number of times of deformation (/20 times) | Times | 1 | 0 | 0 | 0 | 0 | 0 | 0 | 2 |
|  |  | Evaluation of number of times of deformation | — | B | A | A | A | A | A | A | C |

The details of each component shown in Table 2 are as follows.
<Polyimide Resin (A)>
(A1) Polyimide resin 1 obtained in Production Example 1, Mw; 55,000
<Fatty Acid Metal Salt (B)>
(B1) "CS-8CP" (Ca montanate): produced by Nitto Kasei Kogyo K.K., metal content: 4.0 to 5.5 mass %, melting point: 125 to 145° C., 5% weight loss temperature ($T_{d5}$)= 308° C. (in an air atmosphere), 355° C. (in a nitrogen atmosphere)
(B2) "NS-8" (Na montanate): produced by Nitto Kasei Kogyo K.K., metal content: 5.0 to 6.0 mass %, melting point: 200 to 220° C., 5% weight loss temperature ($T_{d5}$)= 295° C. (in an air atmosphere)
(B3) "LS-8" (Li montanate): produced by Nitto Kasei Kogyo K.K., metal content: 1.0 to 2.0 mass %, melting point: 200 to 210° C.
(B4) "HRC-12" (composite alkaline soap; fatty acid metal salt composed of fatty acids of 12-hydroxystearic acid, palmitic acid, and stearic acid and metals of Na and K): produced by Nitto Kasei Kogyo K.K., 5% weight loss temperature ($T_{d5}$)=445° C. (in a nitrogen atmosphere)
<Filler (C)>
(C1) Talc "D-800"; "NANO ACE D-800", produced by Nippon Talc Co., Ltd., average particle size (D50): 0.8 μm
(C2) Glass fiber "T-786H": "T-786H" produced by Nippon Electric Glass Co., Ltd., average fiber length: 3 mm, average fiber diameter: 10.5 μm The evaluation results described in Table 2 indicate the following.

The polyimide resin compositions of Comparative Example 1 and Examples 1 to 7 had good molding processability and heat resistance because of containing the particular polyimide resin (A) having a melting point Tm of 323° C. and a glass transition temperature Tg of 184° C.

Meanwhile, as for the polyimide resin composition of Comparative Example 1, since no particular fatty acid metal salt (B) was contained, the molded article was more likely to adhere to the movable mold than those of Examples 1 to 7, the degree of the adhering was large, and no good releasability was developed.

In contrast, as for the polyimide resin compositions of Examples 1 to 7, since the particular polyimide resin (A) and the particular fatty acid metal salt (B) were contained, the molded articles were more unlikely to adhere to the movable mold than that of Comparative Example 1, the degree of the adhering, if the molded articles adhered, was relatively small, and good releasability was developed.

Among them, from the polyimide resin compositions of Examples 1 to 3, since calcium montanate was used as the particular fatty acid metal salt (B), molded articles having a smaller change in the hue were obtained than that in the polyimide resin composition of Comparative Example 1.

In comparison of Example 2 and Example 6, in both of which the same amount of the fatty acid metal salt (B) was used, calcium montanate having a $T_{d5}$ of 355° C. (in a nitrogen atmosphere) was used as the fatty acid metal salt (B) in Example 2, and composite alkaline soap having a $T_{d5}$ of 445° C. (in a nitrogen atmosphere) was used as the fatty acid metal salt (B) in Example 6. It was found that, in Example 2, in which the fatty acid metal salt (B) having a relatively lower $T_{d5}$ was used, the molded article was more unlikely to adhere to the movable mold, better releasability was developed and further, the change in the hue was smaller than those in Example 6. It is expected that, generally, a fatty acid metal salt (B) having a relatively higher $T_{d5}$ has higher heat resistance, when the composition is subjected to heat molding under heating conditions of 300° C. or more, is more unlikely to be decomposed, and develops better releasability. However, on the basis of the investigation of the applicant, not necessarily as expected, it has been found that, even with calcium montanate, which is a fatty acid metal salt (B) having a relatively low $T_{d5}$, good releasability is developed. The reason is assumed to be that, in a high-temperature melt state of the polyimide resin (A) having a high polar imide bond, calcium montanate was stably present without decomposed.

INDUSTRIAL APPLICABILITY

According to the present invention, there can be provided a polyimide resin composition having good molding processability and heat resistance and developing good releasability even when subjected to heat molding (e.g., injection molding) under heating conditions of 300° C. or more.

The polyimide resin composition of the present invention can be applied in, for example, various industrial members for automobiles, railway, aviation, and the like, members for household electrical products, or enclosures therefor and the like. Specifically, the polyimide resin composition can be applied in gears, bearings, cutting members, screws, nuts, packings, IC sockets for inspection, belts, covering materials for electrical wire and the like, cover-lay films, members for semiconductor manufacturing apparatuses, medical instruments, covering materials for fishing rods, reels, and the like, stationery, and the like.

The invention claimed is:

1. A polyimide resin composition, comprising:
   a polyimide resin (A); and
   a fatty acid metal salt (B),
   wherein the polyimide resin (A) includes a repeating structural unit of formula (1) and a repeating structural unit of formula (2), where a content ratio of the repeating structural unit of the formula (1) with respect to the total of the repeating structural unit of the formula (1) and the repeating structural unit of the formula (2) is 20 to 35 mol %, and
   the fatty acid metal salt (B) includes a fatty acid having 12 to 36 carbon atoms and optionally having a hydroxy group and at least one metal selected from the group consisting of an alkali metal, an alkaline earth metal, and a transition metal:

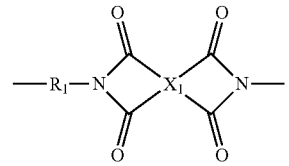

(1)

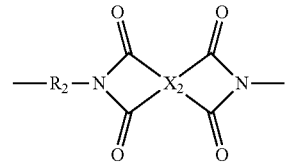

(2)

where $R_1$ is a divalent group having 6 to 22 carbon atoms including at least one alicyclic hydrocarbon structure, $R_2$ is a divalent chain aliphatic group having 5 to 16 carbon atoms, and $X_1$ and $X_2$ are each independently a tetravalent group having 6 to 22 carbon atoms including at least one aromatic ring.

2. The polyimide resin composition according to claim 1, wherein the fatty acid forming the fatty acid metal salt (B) has 16 to 34 carbon atoms.

3. The polyimide resin composition according to claim 1, wherein the metal forming the fatty acid metal salt (B) is an alkaline earth metal.

4. The polyimide resin composition according to claim 1, wherein the fatty acid metal salt (B) has a metal content of 0.5 to 10 mass %.

5. The polyimide resin composition according to claim 1, wherein the fatty acid metal salt (B) is included in an amount of 0.05 to 20 mass % in the polyimide resin composition.

6. The polyimide resin composition according to claim 1, further comprising:
   a filler (C).

7. The polyimide resin composition according to claim 6, wherein the filler (C) includes at least one selected from the group consisting of a particulate or plate-like inorganic filler (C1) and a fibrous inorganic filler (C2).

8. The polyimide resin composition according to claim 7, wherein the particulate or plate-like inorganic filler (C1) is included in an amount of 0.05 to 15 mass % in the polyimide resin composition.

9. The polyimide resin composition according to claim 7, wherein the fibrous inorganic filler (C2) is included in an amount of 15 to 80 mass % in the polyimide resin composition.

10. A molded article, comprising:
    the polyimide resin composition of claim 1.

* * * * *